United States Patent
Liu et al.

(10) Patent No.: US 8,059,517 B2
(45) Date of Patent: Nov. 15, 2011

(54) APPARATUS AND METHOD FOR GENERATING RADIO FREQUENCY RIPPLE ZERO CROSSING SIGNAL

(75) Inventors: Shih-Hsien Liu, Changhua County (TW); Hsing-Sheng Huang, Taichung County (TW); Sih-Kai Wang, Tainan (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 178 days.

(21) Appl. No.: 12/500,613

(22) Filed: Jul. 10, 2009

(65) Prior Publication Data
US 2010/0226221 A1 Sep. 9, 2010

(30) Foreign Application Priority Data
Mar. 6, 2009 (TW) .............................. 98107354 A

(51) Int. Cl.
*G11B 7/00* (2006.01)

(52) U.S. Cl. ............. 369/124.01; 369/44.28; 369/44.32; 369/47.17; 369/53.22

(58) Field of Classification Search ............... 369/124.01
See application file for complete search history.

(56) References Cited

U.S. PATENT DOCUMENTS

| 6,366,549 B1 | 4/2002 | Lee et al. |
| 6,934,234 B2 | 8/2005 | Lai |
| 2006/0087937 A1* | 4/2006 | Maruyama et al. .......... 369/47.1 |

* cited by examiner

*Primary Examiner* — Jorge L Ortiz Criado
(74) *Attorney, Agent, or Firm* — Jianq Chyun IP Office

(57) ABSTRACT

A method for generating an RFZC signal is provided. The method includes the following steps. First, an RF signal is received and the received RF signal is converted into an RF-ENVLP signal. Next, a DC offset of the RF signal is calibrated according to a variation of the RF-ENVLP signal so as to obtain a calibrated RF-ENVLP signal and obtain a gain according to the calibrated RF-ENVLP signal. Then, an RFZC signal is generated according to the calibrated RF-ENVLP signal and the gain.

19 Claims, 9 Drawing Sheets

APPARATUS AND METHOD FOR GENERATING RADIO FREQUENCY RIPPLE ZERO CROSSING SIGNAL

CROSS-REFERENCE TO RELATED APPLICATION

This application claims the priority benefit of Taiwan application serial no. 98107354, filed on Mar. 6, 2009. The entirety of the above-mentioned patent application is hereby incorporated by reference herein and made a part of this specification.

BACKGROUND OF THE INVENTION

1. Field of the Invention

The present invention generally relates to a method for generating a servo signal of an optical storage system, and more particularly, to a method for generating a radio frequency ripple zero crossing signal (RFZC signal) used as the base of track jumping and track following in an optical storage system.

2. Description of Related Art

In a common optical storage system, an RFZC signal in association with a tracking error zero crossing signal (TEZC signal) are used for servo controlling track jumping and track following of an optical pick-up head.

FIG. 1 is a block diagram of a conventional apparatus for generating an RFZC signal and FIG. 2 is a diagram showing the principle of generating an RFZC signal in a conventional apparatus. Referring to FIGS. 1 and 2, a radio frequency signal (RF signal) RF is received by a radio frequency envelope signal generating unit (RF-ENVLP signal generating unit) 102, a radio frequency envelope signal (RF-ENVLP signal) RF-ENVLP is generated by deducting the bottom hold level of RF signal from the peak hold level of the RF signal, or generated by taking the bottom hold level of radio frequency signal only. Then, an RFRP signal generating unit 104 is used to generate a radio frequency ripple signal (RFRP signal), wherein the RFRP signal is generated by calibrating the gain of the RF-ENVLP signal and performing a low-pass filtering (LPF) processing.

After that, a radio frequency ripple signal slicing level generating unit (RFRP signal slicing level generating unit) 106 is used to detect the central level of the RFRP signal so as to obtain a radio frequency ripple signal slicing level (RFRP signal slicing level) RFCT, wherein the common method for generating the RFRP signal slicing level is to use the average value of the peak hold level and the bottom hold level of the RFRP signal. When a DC offset of the RF signal is occurred, a signal calibration unit 108 is used to perform calibration on the RFRP signal, which is able to ensure the desired RF signal slicing level RFCT can be correctly generated based on the RFRP signal. In the end, a signal comparison unit 110 is used to compare the RFRP signal with the RFRP signal slicing level RFCT to generate the RFZC signal.

FIG. 3 is a diagram an abnormal RFZC signal caused by a DC offset of RF signal. Referring to FIG. 3, in the above-mentioned prior art, when a DC offset suddenly occurs with the RF signal, the RF-ENVLP signal would get level drift or saturation cutoff, which limits the compensation effect and makes the RFRP signal slicing level RFCT unable to correctly slice the RFZC signal (as shown by a doted line circle in FIG. 3).

SUMMARY OF THE INVENTION

Accordingly, the present invention is directed to an apparatus for generating an RFZC signal, which is able to calibrate an original signal of generating an RFZC signal so that the calibrated RFZC signal can serve as the base for servo controlling the track jumping and the track following of an optical storage system.

The present invention is also directed to a method for generating RFZC signal, which is able to generate a stable RFZC signal through calibrating the offset and the gain.

The present invention provides an apparatus for generating an RFZC signal, which includes an RF signal calibration module and a radio frequency ripple zero crossing signal generating module (RFZC signal generating module). The RF signal calibration module herein receives an RF signal to generate an RF-ENVLP signal and calibrates a DC offset of the RF signal according to variation of the RF-ENVLP signal so as to obtain a calibrated RF-ENVLP signal and output a gain according to the calibrated RF-ENVLP signal. The RFZC signal generating module herein receives the calibrated RF-ENVLP signal and the gain so as to accordingly generate an RFZC signal.

In an embodiment of the present invention, the above-mentioned RF signal calibration module includes an RF-ENVLP signal generating unit and a signal calibration unit, wherein the RF-ENVLP signal generating unit receives the RF signal to thereby generate the RF-ENVLP signal, and the signal calibration unit receives the RF-ENVLP signal and calibrates the DC offset of the RF signal according to the variation of the RF-ENVLP signal so as to obtain the calibrated RF-ENVLP signal and output the gain according to the calibrated RF-ENVLP signal.

In an embodiment of the present invention, the above-mentioned RFZC signal generating module includes an RFRP signal generating unit, an RFRP signal slicing level generating unit and a signal comparison unit. The RFRP signal generating unit herein receives the calibrated RF-ENVLP signal and the gain and thereby generates a calibrated RFRP signal. The RFRP signal slicing level generating unit receives the calibrated RFRP signal and thereby generates an RFRP signal slicing level. In addition, the signal comparison unit receives the calibrated RFRP signal and the RFRP signal slicing level and thereby generates the RFZC signal.

The present invention also provides a method for generating an RFZC signal. The method includes following steps. First, an RF signal is received and the received RF signal is converted into an RF-ENVLP signal. Next, a DC offset of the RF signal is calibrated according to a variation of the RF-ENVLP signal so as to obtain a calibrated RF-ENVLP signal and obtain a gain according to the calibrated RF-ENVLP signal. Then, an RFZC signal is generated according to the calibrated RF-ENVLP signal and the gain.

In an embodiment of the present invention, the above-mentioned step of generating an RFZC signal according to the calibrated RF-ENVLP signal and the gain includes: generating a calibrated RFRP signal according to the calibrated RF-ENVLP signal and the gain; then, generating an RFRP signal slicing level according to the calibrated RFRP signal; after that, comparing the calibrated RFRP signal with the RFRP signal slicing level to thereby generate the RFZC signal.

Based on the described above, the present invention can directly calibrate the original signal used for generating an RFZC signal, which ensures the stability of the RFZC signal and makes the generated RFZC signal correctly serving as the base for an optical storage system to servo control track jumping operations and track following operations.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
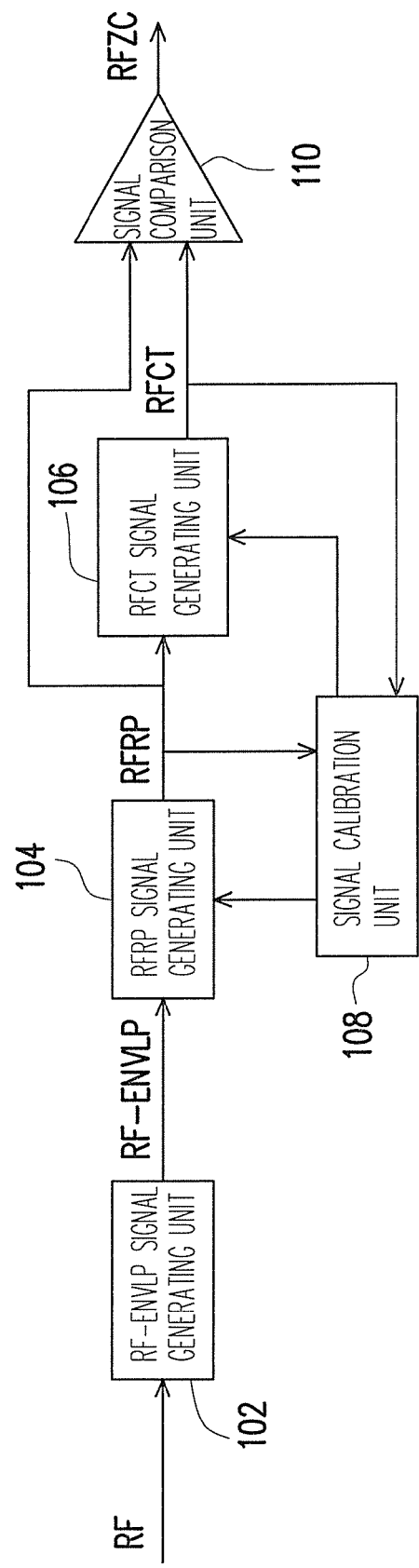
FIG. 1 is a block diagram of a conventional apparatus for generating an RFZC signal.
Figure 2:
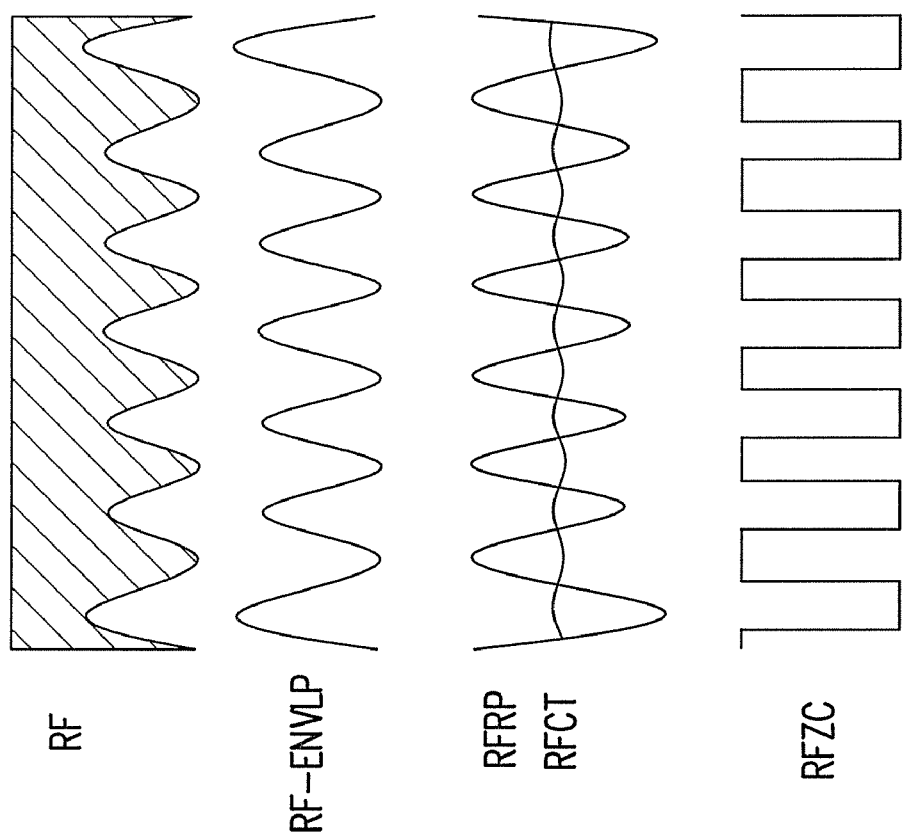
FIG. 2 is a diagram showing the principle of generating a conventional apparatus for generating an RFZC signal.
Figure 3:
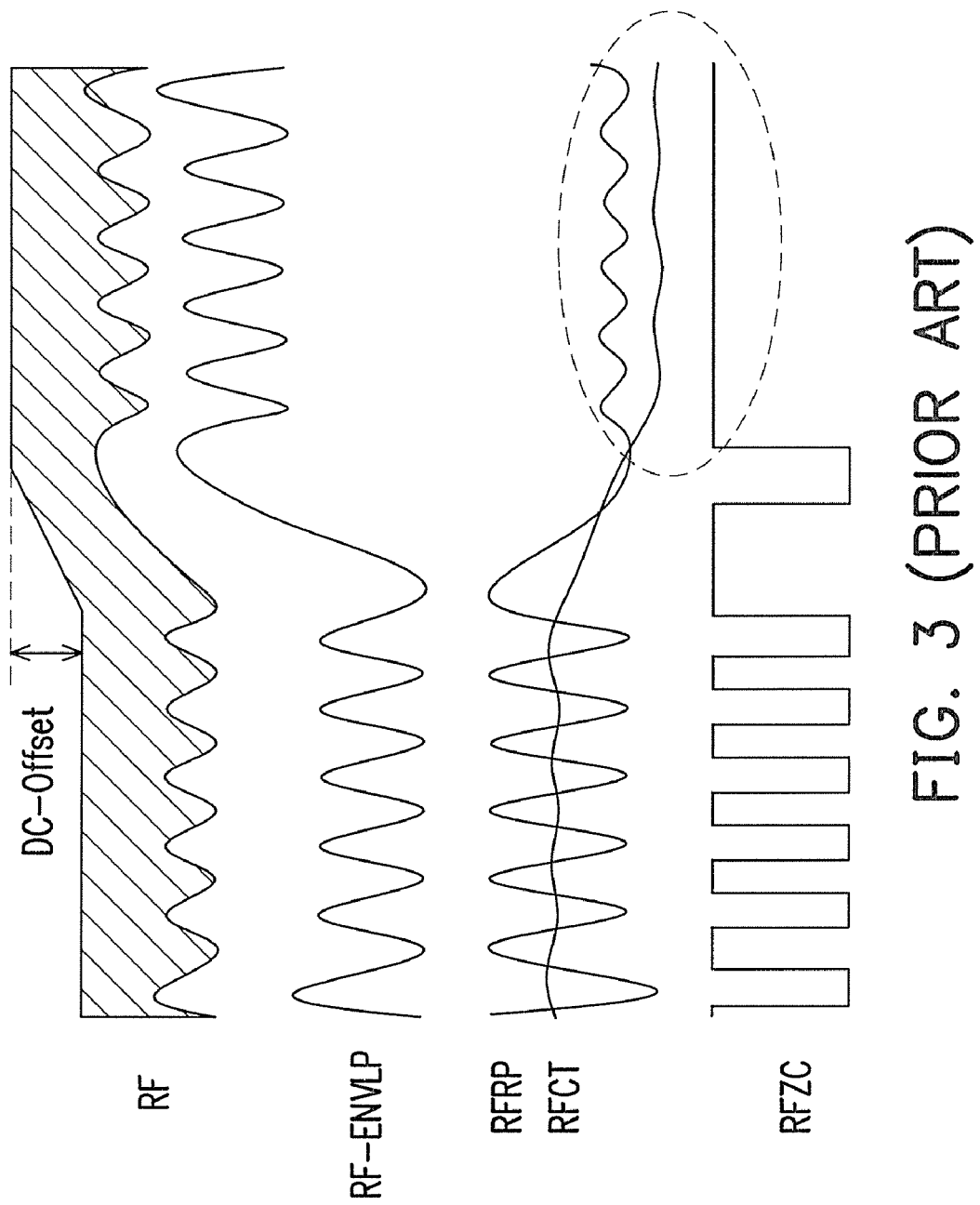
FIG. 3 is a diagram an abnormal RFZC signal caused by a DC offset of RF signal.

Reference will now be made in detail to the present preferred embodiments of the invention, examples of which are illustrated in the accompanying drawings. Wherever possible, the same reference numbers are used in the drawings and the description to refer to the same or like parts.

In the following, the depicted embodiments together with the included drawings are intended to explain the feasibility of the present invention, wherein a same notation or a similar notation is for marking the same or the similar portions. Note that the diagrams are simplified and not in an accurate scale to the real objects. In addition, the following depicted embodiments do not cover all feasible embodiments of the present invention, instead, they are only some of the examples of the systems and methods related to the claims of the present invention.

Figure 4:
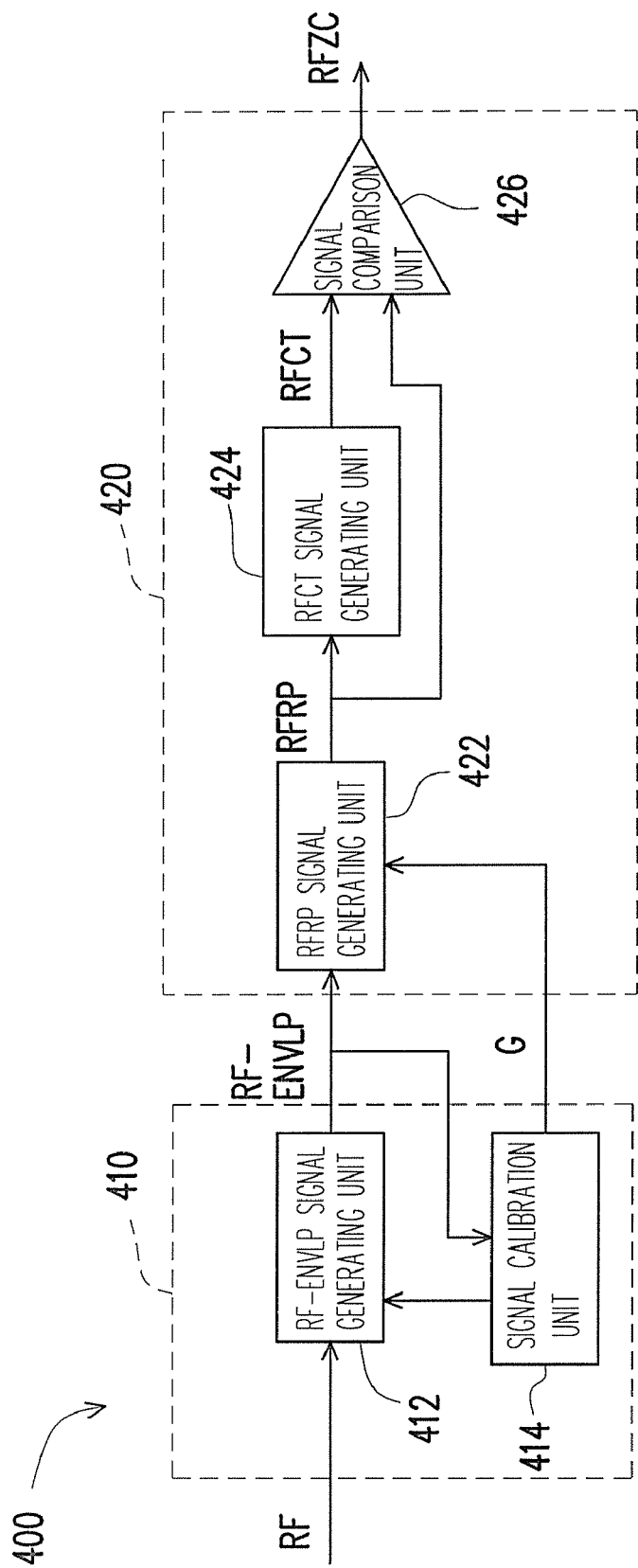
FIG. 4 is a block diagram of an apparatus for generating an RFZC signal according to an embodiment of the present invention.

FIG. 4 is a block diagram of an apparatus for generating an RFZC signal according to an embodiment of the present invention. Referring to FIG. 4, an apparatus for generating an RFZC signal 400 includes an RF signal calibration module 410 and an RFZC signal generating module 420. The RF signal calibration module 410 is coupled to the RFZC signal generating module 420, wherein the RF signal calibration module 410 receives an RF signal to generate an RF-ENVLP signal and calibrates a DC offset of the RF signal according to that whether or not a preset value of radio frequency envelope signal falls within a predetermined target range.

In an embodiment of the present invention, the preset value of radio frequency envelope signal can be one of the bottom hold level of the RF-ENVLP signal, the peak hold level of the RF-ENVLP signal and the average of the bottom hold level and the peak hold level of the RF-ENVLP signal. The predetermined range can be in the range between the signal peak value and the signal bottom value of the RF-ENVLP signal. By conducting a calibration of the offset, a calibrated RF-ENVLP signal is obtained and a gain G is output according to the calibrated RF-ENVLP signal. In addition, the RFZC signal generating module 420 receives the calibrated RF-ENVLP signal and the gain G to thereby generate an RFZC signal.

In more details, the RF signal calibration module 410 can include an RF-ENVLP signal generating unit 412 and a signal calibration unit 414. The RF-ENVLP signal generating unit 412 receives the RF signal and generates the RF-ENVLP signal. The signal calibration unit 414 is coupled to the RF-ENVLP signal generating unit 412 and an RFRP signal generating unit 422, receives the RF-ENVLP signal, performs a calibration of the DC offset on the RF signal so as to obtain the calibrated RF-ENVLP signal and outputs the gain G according to the calibrated RF-ENVLP signal.

On the other hand, the RFZC signal generating module 420 includes an RFRP signal generating unit 422, an RFRP signal slicing level generating unit 424 and a signal comparison unit 426. The RFRP signal generating unit 422 is coupled to the RF-ENVLP signal generating unit 412 and the signal calibration unit 414 to receive the calibrated RF-ENVLP signal and the gain G and thereby generate a calibrated radio frequency ripple signal (calibrated RFRP signal). The RFRP signal slicing level generating unit 424 is coupled to the RFRP signal generating unit 422 for receiving the calibrated RFRP signal and generating a radio frequency signal slicing level (RF signal slicing level) RFCT. The signal comparison unit 426 is coupled to the RFRP signal generating unit 422 and the RFRP signal slicing level generating unit 424 for receiving the calibrated RFRP signal and the RF signal slicing level RFCT, comparing the calibrated RFRP signal with the RF signal slicing level RFCT and thereby generating the RFZC signal.

Figure 5:
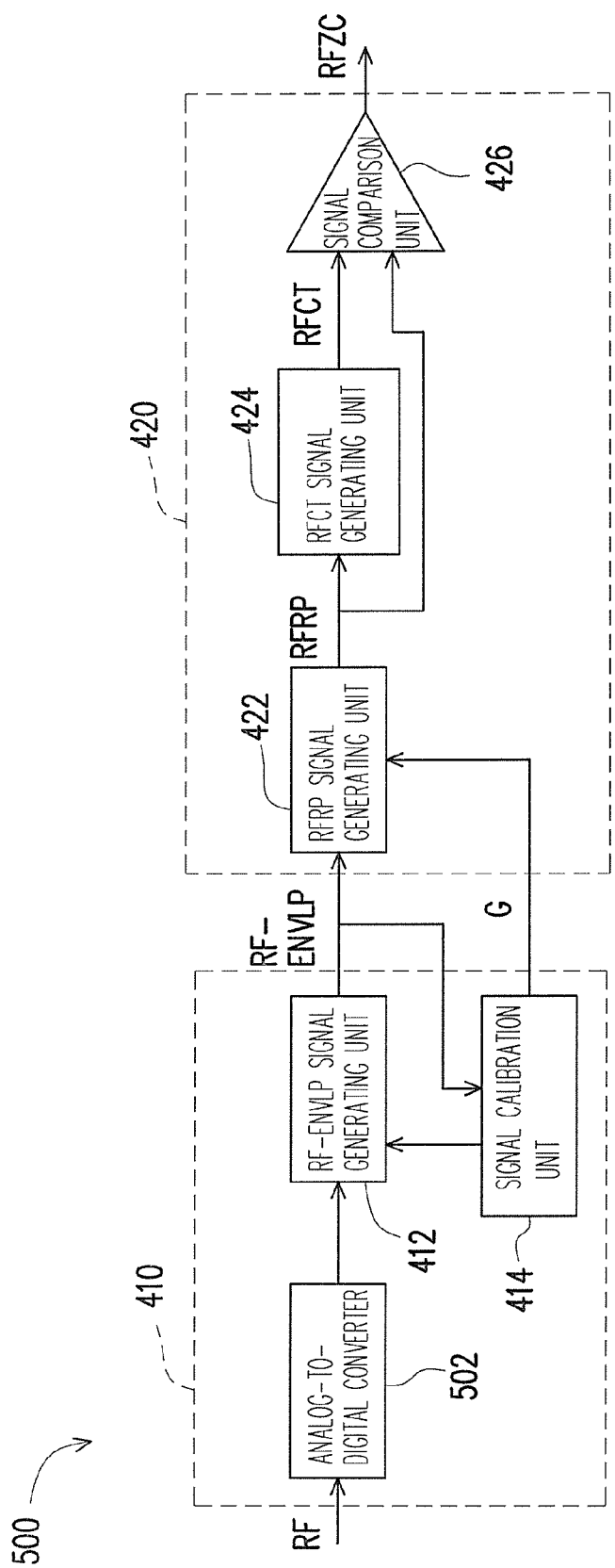
FIG. 5 is a block diagram of an apparatus for generating an RFZC signal according to another embodiment of the present invention.

FIG. 5 is a block diagram of an apparatus for generating an RFZC signal according to another embodiment of the present invention. Referring to FIG. 5, in the apparatus for generating an RFZC signal 500, the RF signal calibration module 410 further includes an analog-to-digital converter (ADC 502). The ADC 502 is coupled to the RF-ENVLP signal generating unit 412 for receiving the RF signal, converting the RF signal into a digital signal and outputting the digital signal to the RF-ENVLP signal generating unit 412, so that the signal calibration unit 414 can be used to calibrate the RF signal. The signal calibration unit 414 herein can be a digital signal processor (DSP).

Figure 6:
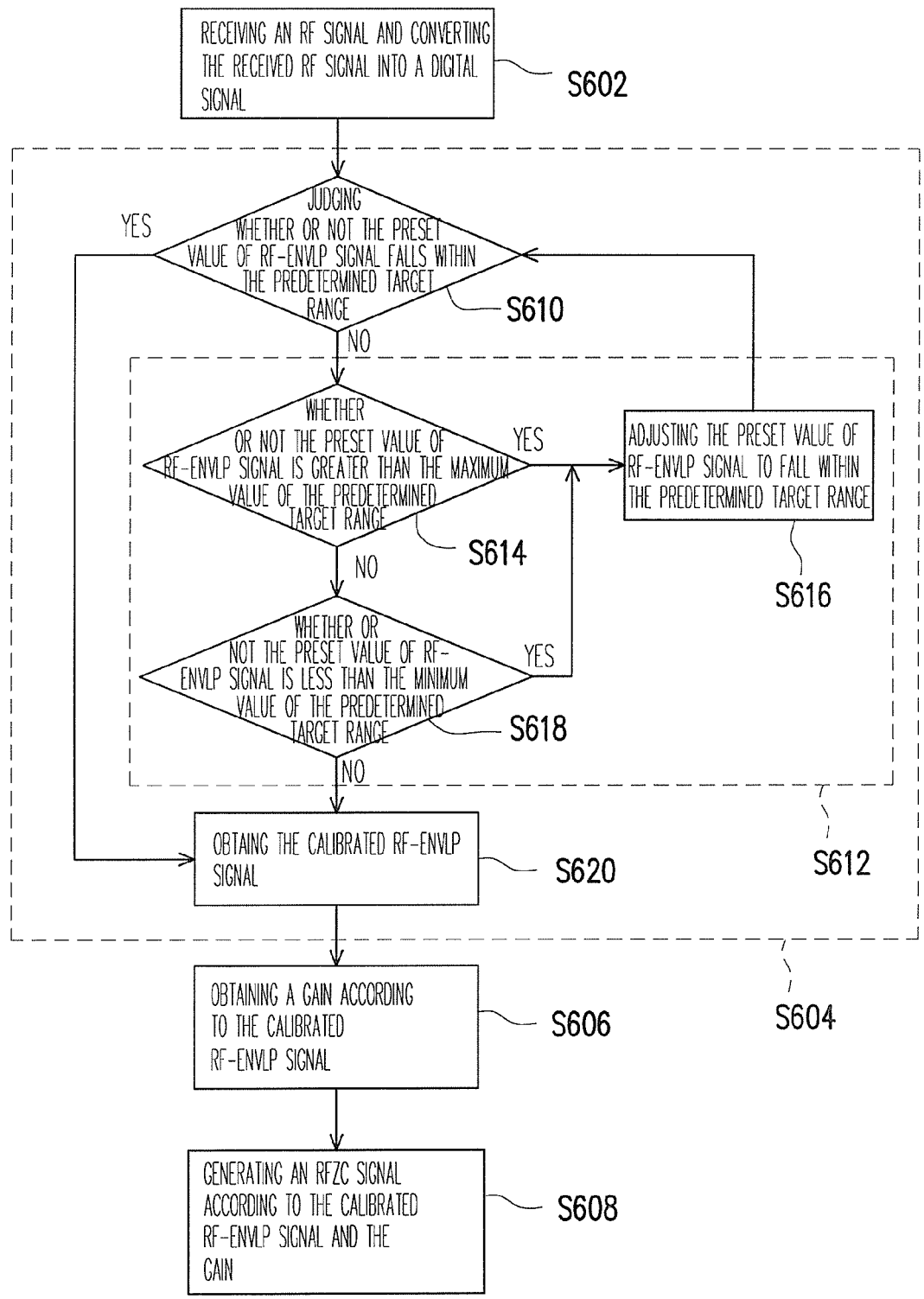
FIG. 6 is a flowchart diagram of a method for generating RFZC signal according to an embodiment of the present invention.

FIG. 6 is a flowchart diagram of a method for generating RFZC signal according to an embodiment of the present invention. In the following, the apparatus for generating an RFZC signal 500 of FIG. 5 is used to describe the method for calibrating the RF signal, as shown by steps S602-S620 in FIG. 6.

Referring to FIGS. 5 and 6, first in step S602, the ADC 502 is used to receive an RF signal, convert the received RF signal into a digital signal and send the digital signal to the RF-ENVLP signal generating unit 412, and the RF-ENVLP signal generating unit 412 receives the converted RF signal to generate an RF-ENVLP signal. Next in step S604, the signal calibration unit 414 performs a calibration of the DC offset of the RF signal according to that whether or not a preset value of RF-ENVLP signal falls within a predetermined target range and thereby obtains a calibrated RF-ENVLP signal. Then in step S606, the signal calibration unit 414 obtains a gain G according to the calibrated RF-ENVLP signal.

After that in step S608, the signal comparison unit 426 receives a calibrated RFRP signal and an RF signal slicing level RFCT to generate an RFZC signal, wherein the calibrated RFRP signal is generated by the RFRP signal generating unit 422 where the RFRP signal generating unit 422 receives the calibrated RF-ENVLP signal and the gain G and multiplies the RFRP signal by the obtained gain G so as to generate the calibrated RFRP signal; the RF signal slicing level RFCT is generated by the RFRP signal slicing level generating unit 424 where the RFRP signal slicing level generating unit 424 receives the calibrated RFRP signal so as to generate the RF signal slicing level RFCT.

It should be noted that in order to avoid amplifying the offset at the time to adjust the gain G, usually, the calibration of the gain is arranged after finishing the calibration of the offset, which the present invention is not limited to.

In more details, in step S604, the step of obtaining the calibrated RF-ENVLP signal includes judging whether or not a preset value of RF-ENVLP signal falls within a predetermined target range (step S610). The preset value of RF-ENVLP signal can be one of the bottom hold level of the radio frequency envelope signal, the peak hold level of the radio frequency envelope signal and the average of the bottom hold level and the peak hold level of the radio frequency envelope signal. In addition, the predetermined target range can be between the signal peak value and the signal bottom value of the RF-ENVLP signal. The above-mentioned preset value of RF-ENVLP signal and predetermined target range of the RF-ENVLP signal can be defined according to the application practice, which the present invention is not limited to.

When the preset value of RF-ENVLP signal falls within the predetermined target range, a calibrated RF-ENVLP signal is obtained (step S620). When the preset value of RF-ENVLP signal falls out of the predetermined target range, the DC offset of the RF signal can be adjusted according to the relationship between the preset value of RF-ENVLP signal and the predetermined target range (step S612).

In more details, a step of judging whether or not the preset value of RF-ENVLP signal is greater than the maximum value of the predetermined target range is conducted (step S614). If the preset value of RF-ENVLP signal is greater than the maximum value of the predetermined target range, the preset value of RF-ENVLP signal is adjusted to fall within the predetermined target range (step S616). If the preset value of RF-ENVLP signal is not greater than the maximum value of the predetermined target range, the step of judging whether or not the preset value of RF-ENVLP signal is less than the minimum value of the predetermined target range is conducted (step S618). If the preset value of RF-ENVLP signal is less than the minimum value of the predetermined target range, the preset value of RF-ENVLP signal is adjusted to fall within the predetermined target range (step S616); otherwise, the calibrated RF-ENVLP signal is obtained (step S620).

Figure 7:
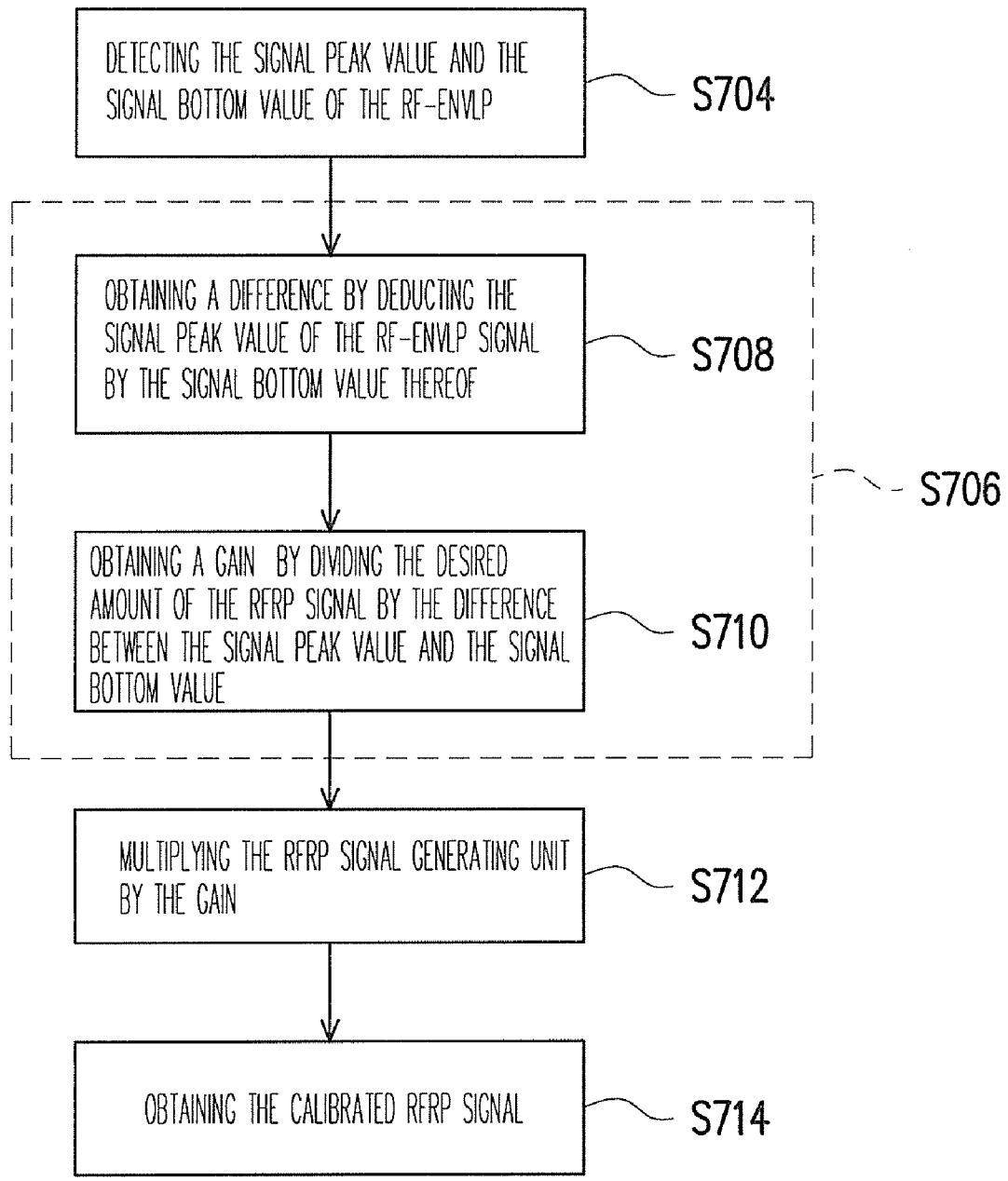
FIG. 7 is a flowchart diagram of a method for calibrating the gain of a RFRP signal (RFRP signal) according to an embodiment of the present invention.

FIG. 7 is a flowchart diagram of a method for calibrating the gain of a RFRP signal according to an embodiment of the present invention. Referring to FIG. 7, first, the signal peak value and the signal bottom value of the RF-ENVLP signal is detected (step S704). Next, a gain G is calculated according to the desired amount of the RFRP signal (step S706). Then, for example, a difference is obtained by deducting the signal peak value of the RF-ENVLP signal by the signal bottom value thereof (step S708). After that, the gain G is obtained by dividing the desired amount of the RFRP signal by the difference between the signal peak value and the signal bottom value (step S710). Further, the calibrated RFRP signal is obtained (step S714) by multiplying the RFRP signal generating unit by the obtained gain G (step S712).

Figure 8:
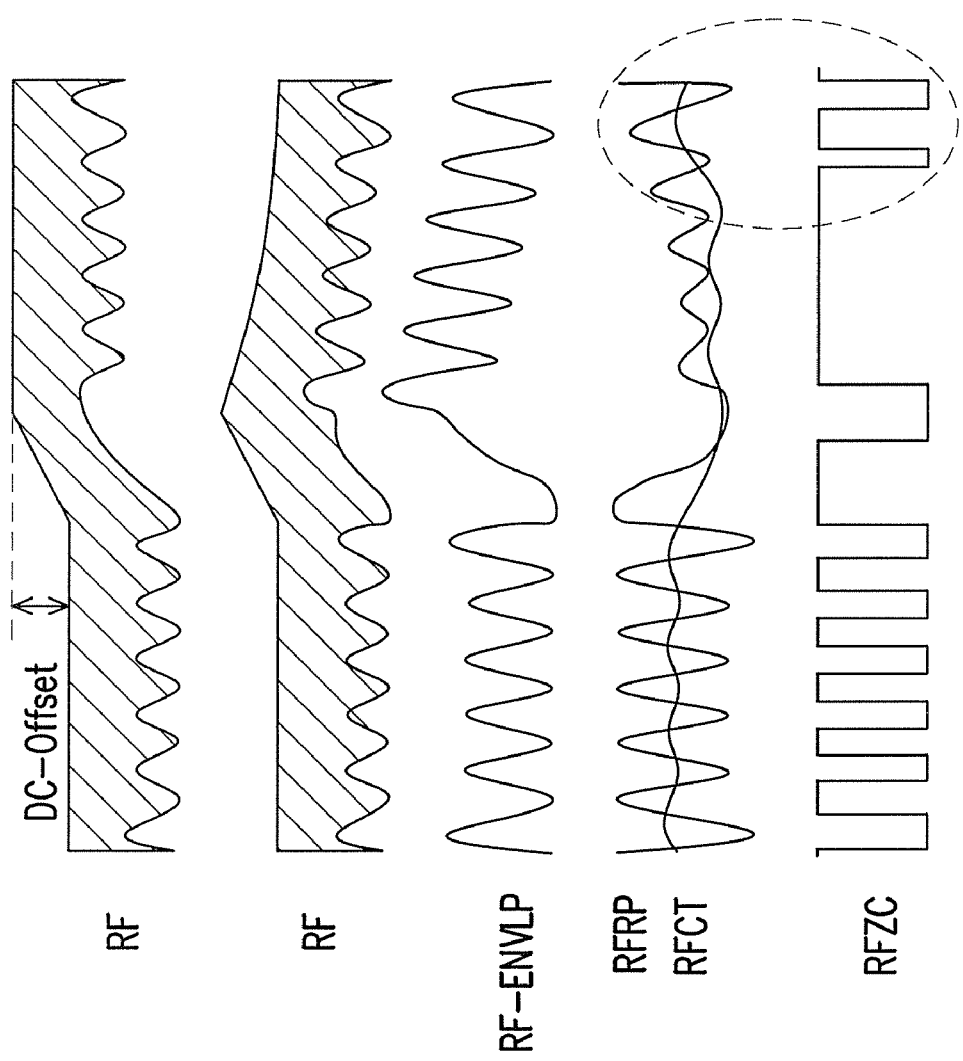
FIG. 8 is a diagram showing the changed RFZC signal after calibrating according to an embodiment of the present invention.

FIG. 8 is a diagram showing the changed RFZC signal after calibrating according to an embodiment of the present invention. Referring to FIG. 8, when a DC offset suddenly occurs with the RF signal, that is the preset value of RF-ENVLP signal falls within the predetermined target range, a level drift or saturation cutoff with the RF-ENVLP signal is caused. However, the method for generating an RFZC signal of the embodiment is able to calibrate the off set of the RF signal according to the variation of the RF-ENVLP signal, so that the calibrated RF-ENVLP signal is obtained and the level of the RFRP signal can be gradually recovered to the normal level. In this way, the RF signal slicing level RFCT is able to slice the calibrated RFRP signal and the correct RFZC signal can be generated (as shown by the dotted circle in FIG. 8).

Figure 9:
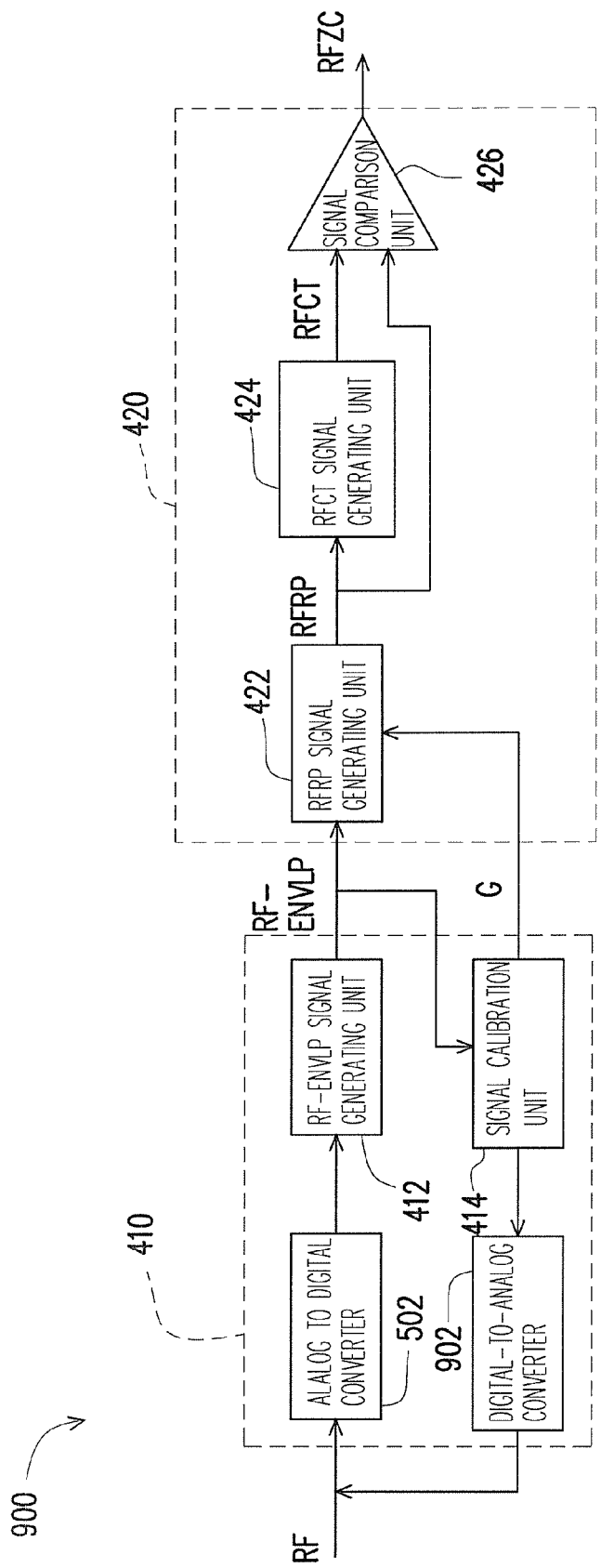
FIG. 9 is a block diagram of an apparatus for generating an RFZC signal according to yet another embodiment of the present invention.

FIG. 9 is a block diagram of an apparatus for generating an RFZC signal according to yet another embodiment of the present invention. Referring to FIG. 9, the apparatus for generating an RFZC signal 900 is similar to the apparatus for generating an RFZC signal 500 of FIG. 5 except that the RF signal calibration module 410 herein further includes a digital-to-analog converter (DAC) 902. The DAC 902 is coupled to the signal calibration unit 414, so that the signal calibration unit 414 can calibrate the RF signal not yet sampled by the ADC 502 through the DAC 902, which is advantageous in obtaining a more accurate RFZC signal.

In summary, the present invention can directly calibrate the original signal used for generating an RFZC signal, which ensures the stability of the RFZC signal and makes the generated RFZC signal correctly serving as the base for an optical storage system to servo control track jump operations and track following operations without using complex peripheral circuits for the calibration purpose. As a result, the apparatus and the method of the present invention can be used in the mass production of an optical storage system.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An apparatus for generating a radio frequency ripple zero crossing signal, and suitable for an optical storage system, the apparatus comprising:
    a radio frequency signal calibration module, processing a radio frequency signal to obtain a calibrated radio frequency envelope signal and outputting a gain according to the calibrated radio frequency envelope signal; and
    a radio frequency ripple zero crossing signal generating module, coupled to the radio frequency signal calibration module for receiving the calibrated radio frequency envelope signal and the gain only relating to the calibrated radio frequency envelope signal so as to generate a radio frequency ripple zero crossing signal.

2. The apparatus for generating a radio frequency ripple zero crossing signal as claimed in claim 1, wherein the radio frequency signal calibration module comprises:
    a radio frequency envelope signal generating unit, receiving the radio frequency signal to generate a radio frequency envelope signal; and
    a signal calibration unit, coupled to the radio frequency envelope signal generating unit, for receiving the radio frequency envelope signal and calibrating a DC offset of the radio frequency signal according to a variation of the radio frequency envelope signal so as to obtain the calibrated radio frequency envelope signal and output the gain according to the calibrated radio frequency envelope signal.

3. The apparatus for generating a radio frequency ripple zero crossing signal as claimed in claim 2, wherein the radio frequency ripple zero crossing signal generating module comprises:

a radio frequency ripple signal generating unit, coupled to the radio frequency envelope signal generating unit for receiving the calibrated radio frequency envelope signal and the gain and thereby generating a calibrated radio frequency ripple signal;

a radio frequency ripple signal slicing level generating unit, coupled to the radio frequency ripple signal generating unit for receiving the calibrated radio frequency ripple signal and thereby generating a radio frequency ripple signal slicing level; and a signal comparison unit, coupled to the radio frequency ripple signal generating unit and the radio frequency ripple signal slicing level generating unit for receiving the calibrated radio frequency ripple signal and the radio frequency ripple signal slicing level and thereby generating the radio frequency ripple zero crossing signal.

4. The apparatus for generating a radio frequency ripple zero crossing signal as claimed in claim 3, wherein the variation of the radio frequency envelope signal comprises a preset value of radio frequency envelope signal being within a predetermined target range or out of the predetermined target range.

5. The apparatus for generating a radio frequency ripple zero crossing signal as claimed in claim 4, wherein the preset value of radio frequency envelope signal comprises one of the bottom hold level of the radio frequency envelope signal, the peak hold level of the radio frequency envelope signal and the average of the bottom hold level and the peak hold level of the radio frequency envelope signal.

6. The apparatus for generating a radio frequency ripple zero crossing signal as claimed in claim 4, wherein the predetermined target range is between the signal peak value and the signal bottom value of the radio frequency envelope signal.

7. The apparatus for generating a radio frequency ripple zero crossing signal as claimed in claim 2, wherein the signal calibration unit comprises a digital signal processor.

8. The apparatus for generating a radio frequency ripple zero crossing signal as claimed in claim 7, wherein the radio frequency signal calibration module further comprises an analog-to-digital converter coupled to the radio frequency envelope signal generating unit for receiving the radio frequency signal and converting the radio frequency signal into a digital signal output to the radio frequency envelope signal generating unit.

9. The apparatus for generating a radio frequency ripple zero crossing signal as claimed in claim 8, wherein the radio frequency signal calibration module further comprises a digital signal processor coupled to the signal calibration unit so that the digital signal processor performs an offset calibration on the radio frequency signal prior to being sampled by the digital signal processor.

10. A method for generating a radio frequency ripple zero crossing signal, and suitable for an optical storage system, the method comprising:

receiving a radio frequency signal and converting the received radio frequency signal into a radio frequency envelope signal;

calibrating a DC offset of the radio frequency signal by detecting a variation of the radio frequency envelope signal so as to obtain a calibrated radio frequency envelope signal and obtaining a gain according to the calibrated radio frequency envelope signal; and generating a radio frequency ripple zero crossing signal according to the calibrated radio frequency envelope signal and the gain only relating to the calibrated radio frequency envelope signal.

11. The method for generating a radio frequency ripple zero crossing signal as claimed in claim 10, wherein the detecting the variation of radio frequency envelope signal comprises judging whether or not a preset value of radio frequency envelope signal falls within a predetermined target range.

12. The method for generating a radio frequency ripple zero crossing signal as claimed in claim 11, wherein the preset value of radio frequency envelope signal comprises one of the bottom hold level of the radio frequency envelope signal, the peak hold level of the radio frequency envelope signal and the average of the bottom hold level and the peak hold level of the radio frequency envelope signal.

13. The method for generating a radio frequency ripple zero crossing signal as claimed in claim 11, wherein the predetermined target range is between the signal peak value and the signal bottom value of the radio frequency envelope signal.

14. The method for generating a radio frequency ripple zero crossing signal as claimed in claim 11, wherein the step of calibrating the DC offset of the radio frequency signal so as to obtain the calibrated radio frequency envelope signal comprises:

obtaining the calibrated radio frequency envelope signal if the preset value of radio frequency envelope signal falls within the predetermined target range is determined; and adjusting the offset of the radio frequency envelope signal according to the relationship between the preset value of radio frequency envelope signal and the predetermined target range so as to obtain the calibrated radio frequency envelope signal if the preset value of radio frequency envelope signal falls out of the predetermined target range is determined.

15. The method for generating a radio frequency ripple zero crossing signal as claimed in claim 14, wherein the step of adjusting the offset of the radio frequency envelope signal according to the relationship between the preset value of radio frequency envelope signal and the predetermined target range comprises:

when the preset value of radio frequency envelope signal is greater than the maximum value of the predetermined target range or less than the minimum value of the predetermined target range, adjusting the preset value of radio frequency envelope signal into the one within the predetermined target range.

16. The method for generating a radio frequency ripple zero crossing signal as claimed in claim 10, wherein the step of obtaining the gain according to the calibrated radio frequency envelope signal comprises:

detecting out the signal peak value and the signal bottom value of the calibrated radio frequency envelope signal; and obtaining the gain by calculation according to a desired amount of radio frequency ripple signal.

17. The method for generating a radio frequency ripple zero crossing signal as claimed in claim 16, wherein the step of obtaining the gain by calculation according to the desired amount of radio frequency ripple signal comprises:

deducting the signal bottom value from the signal peak value of the radio frequency envelope signal so as to obtain a difference; and dividing the desired amount of radio frequency ripple signal by the difference so as to obtain the gain.

18. The method for generating a radio frequency ripple zero crossing signal as claimed in claim 10, wherein the step of generating a radio frequency ripple zero crossing signal according to the calibrated radio frequency envelope signal and the gain comprises:
- obtaining a calibrated radio frequency ripple signal according to the calibrated radio frequency envelope signal and the gain;
- generating a radio frequency ripple signal slicing level according to the calibrated radio frequency ripple signal; and
- comparing the calibrated radio frequency ripple signal with the radio frequency ripple signal slicing level to thereby generate the radio frequency ripple zero crossing signal.

19. The method for generating a radio frequency ripple zero crossing signal as claimed in claim 18, wherein the step of obtaining the calibrated radio frequency ripple signal comprises:
- generating a radio frequency ripple signal according to the calibrated radio frequency envelope signal; and
- multiplying the radio frequency ripple signal by the gain so as to obtain the calibrated radio frequency ripple signal.

* * * * *